United States Patent [19]

Gavin et al.

[11] 3,759,932

[45] Sept. 18, 1973

[54] METHOD FOR PREPARING MERCAPTOPYRIDINES USING ALKALI METAL POLYSULFIDES

[75] Inventors: David F. Gavin, Cheshire; Maurice A. Raymond, Northford, both of Conn.

[73] Assignee: Olin Corporation, New Haven, Conn.

[22] Filed: Aug. 25, 1972

[21] Appl. No.: 283,862

Related U.S. Application Data

[63] Continuation-in-part of Ser. No. 33,517, April 30, 1970, abandoned.

[52] U.S. Cl............................ 260/294.8 G, 424/263
[51] Int. Cl............................................. C07d 31/50

[58] Field of Search............................. 260/294.8 G

[56] References Cited
UNITED STATES PATENTS
1,753,658    4/1930    Kochendoerfer............ 260/294.8 G OTHER PUBLICATIONS
Jones, J. Chem. Soc., London, Pages 3610–13, 1958

*Primary Examiner*—Alan L. Rotman
*Attorney*—Eugene Zagarella, Jr. et al.

[57]     ABSTRACT

This invention relates to an improved and economical method for preparing mercaptopyridines by reaction of selected halosubstituted pyridines with an alkali metal polysulfide.

13 Claims, No Drawings

METHOD FOR PREPARING MERCAPTOPYRIDINES USING ALKALI METAL POLYSULFIDES

This application is a continuation-in-part of copending application Ser. No. 33,517, filed Apr. 30, 1970, now abandoned.

This invention relates to an improved, economical method for the preparation of mercaptopyridines in exceptionally high yields. More particularly this invention relates to the reaction of selected halosubstituted pyridines with an alkali metal polysulfide followed by acidification, digestion and neutralization to form the respective mercapto compounds.

The compounds prepared by the method of this invention and derivatives thereof, are well known for their utility as fungicides and bactericides as for example, shown in U.S. Pat. No. 2,686,786 (Tables I and II); as a preservative in a wide variety of products as for example, shown in U.S. Pat. No. 2,742,393 and U.S. Pat. No. 3,236,733 discloses various metal salts of pyridine-thiones used in detergent compositions and in hair shampoo for combatting dandruff. Similar properties are shown for the dithio derivatives of mercaptopyridine as shown for example in U.S. Pat. No. 2,742,476.

Previous methods for preparing mercaptopyridines include: 1) the reaction of 2-chloropyridine with thiourea in ethanol to produce 2-mercaptopyridine (R. A. Jones, J.Chem.Soc. 1958, 3610); 2) reaction of 2-chloropyridine with sodium hydrosulfide in propylene glycol to produce 2-mercaptopyridine (Bernard Miller, J.Am.Chem.Soc. 84, 403, 1962); 3) reaction of 4-pyridylpyridinium chloride with $H_2S$ to produce 4-mercaptopyridine; and 4) reaction of the N-oxide of halopyridine with an alkali metal sulfide or hydrosulfide (U.S. Pat. No. 2,686,786). U.S. Pat. No. 1,753,658 broadly discloses the preparation of mercaptopyridine compounds using metal sulfides such as potassium hydrogen sulfide in a manner shown in U.S. Pat. No. 2,686,786 noted previously. While the patent does broadly indicate that the disulfide may be used, there is no suggestion of using polysulfides as defined herein particularly the preferred embodiments. More significantly, there is no teaching of how the disulfide may be used in this reaction and clearly there is no suggestion of the technique as disclosed in this application wherein following reaction, the mixture is acidified, digested and neutralized.

The above methods are considered economically unattractive because generally they do not result in very high yields of pure product and additionally often involve detailed and expensive work-up and recovery operations.

Now it has been found that selected substituted derivatives of mercaptopyridine can be conveniently and economically provided in exceptionally high yield in an integrated process by reacting select halosubstituted pyridines with an alkali metal polysulfide and then acidifying, digesting and neutralizing as shown by the following equation wherein for example, 2-chloropyridine is reacted with sodium polysulfide:

This result, wherein high yields are obtained, is especially surprising since an attempt to prepare mercaptopyridine using sodium sulfide ($Na_2S \cdot 9H_2O$) resulted in only trace amounts of the desired product (See Example VII).

The alkali metal polysulfide solution used in the method of this invention may generally be obtained by combining desired amounts of alkali metal sulfide and sulfur in solution and the formulation of the polysulfide will vary depending on such amounts. Additional methods for obtaining the desired alkali metal polysulfides are disclosed in "Polysulfide Polymers" by E. M. Fettes and J. S. Jorczak in J.Industrial and Engineering Chem., Vol. 42, 1950, pp. 2217-2218.

It is further noted that the extremely valuable dithiopyridine derivatives, which have several well-known uses, can be formed directly from the resulting mercaptopyridine product by the well-known step of oxidizing said mercaptopyridine compound as shown in U.S. Pat. No. 2,742,476. It is further noted that this preparation may be formed in situ without isolating the mercaptopyridine compound.

The starting materials suitable for use in this invention are any of the substituted aza-aromatic compounds and more particularly, the substituted pyridines of the formula:

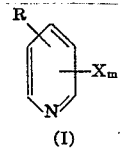

(I)

where each X is an independently selected halogen group e.g., chlorine, bromine, fluorine and iodine, preferably chlorine, bromine and iodine; R is hydrogen, alkyl and more particularly lower alkyl of 1 to 4 carbon atoms e.g., methyl, propyl and butyl, or amino and preferably hydrogen; and m is an integer of 1 to 5. The N-oxides and the acid salts of any of the above compounds may also be used as starting materials. Additionally compounds of the above formula (I) containing more than one of the noted substituents as well as other substituents such as phenyl, nitro and alkoxy groups may also be used. Reference to the substituted pyridines (I) in the specification and claims is intended to include compounds containing such substituents as well as the N-oxides and acid salts thereof. It is further noted that while more than one halogen group may be used and while such halogens may be attached to any position on the pyridine ring, it is preferable that such halogens be attached at the 2, 4 and 6 positions since better yields and faster reaction rates generally result when using such positions.

Illustrative of the starting materials of formula (I) are the following: 2-chloropyridine, 2-bromopyridine, 2-iodopyridine, 4-chloropyridine, 2-chloro-3-picoline, 3-fluoro-4-picoline, 2-chloro-3-ethylpyridine, 2-chloro-4-propylpyridine, 6-chloro-2-isobutylpyridine, 2-bromo-3-picoline, 2-bromo-4-ethylpyridine, 2-bromo-4-propylpyridine, 6-bromo-2-propylpyridine, 2-chloro-3-aminopyridine, 2-chloro-5-

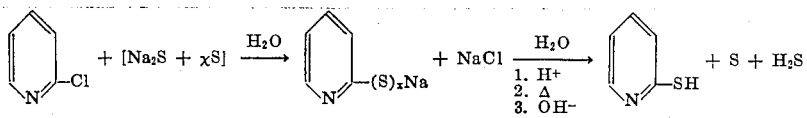

aminopyridine, 2-amino-5-bromopyridine, 2-amino-5-iodopyridine, 2,3-dichloropyridine, 2,4-dichloropyridine, 2,5-dichloropyridine, 2,5-dibromopyridine, 2,5-diiodopyridine, 2-bromo-5-chloropyridine, 2,6-difluoropyridine, 2,3,5-tribromopyridine, 2,3,4,5-tetrachloropyridine, pentachloropyridine and pentabromopyridine. Further illustrations of compounds having the above designated formula are disclosed in "The Chemistry of Heterocyclic Compounds," edited by Arnold Weissberger, Part 2, Chapter VI, *Halopyridines*, Holly E. Mertel and Chapter IV, *Pyridine-N-Oxides*, Elliot N. Shaw, 1961, Interscience Publishers, N.Y.

The polysulfides which may be used in the method of this invention are any of the alkali metal polysulfides and more particularly alkali metal polysulfides of the formula:

$M_2S_x$ wherein M is an alkali metal and more particularly sodium, potassium and lithium, preferably sodium and potassium and more preferably sodium and $x$ is an average number of from about 2 to about 8, preferably from about 3 to about 8 and more preferably from about 4 to about 8. It is noted that although the polysulfides of this formula wherein $x$ is about 2 may be used, surprisingly high yields resulted when using the preferred amounts wherein $x$ is from about 3 to about 8 or from about 4 to about 8.

The polysulfides of this invention may be prepared in various ways as noted previously on pages 3 and 4. A preferred method of preparation is by forming the polysulfide in solution by combining the selected alkali metal sulfide with sulfur. The amounts of alkali metal sulfide (hydrated or anhydrous) and sulfur used will vary widely depending on the desired formulation of the polysulfide mercaptizing agent. In preparing the polysulfide solution the ratio of alkali metal sulfide to the selected halopyridine will generally vary from 1:1 to 4:1 parts by weight and more particularly from 1:1 to 1.5:1 and the ratio of sulfur to selected halopyridine will generally vary from 1:1 to 20:1 parts by weight and more particularly from 2:1 to 7:1.

It is to be noted that when referring in the specification and claims to the alkali metal polysulfides as noted above, it is intended to include the polysulfide compounds themselves as well as solutions containing such polysulfides and mixtures thereof.

The reaction of the halosubstituted pyridine with alkali metal polysulfide may be performed in any aqueous medium including mediums which contain any of the well-known organic solvents which are miscible with water and mixtures thereof, including for example: the lower alcohols such as methanol, ethanol and the propanols; the polyols such as ethylene glycol and diethylene glycol; tetrahydrofuran and dioxane. This reaction may be carried out over a wide range of temperatures and more particularly may vary from about ambient temperature to about the reflux temperature of the system being used with the reflux temperature being preferred. More particularly, the reaction temperature may vary from about 0° to 200° C. and preferably from 50° to 150° C. Additionally, while atmospheric pressure conditions are perfectly suitable, varying amounts of pressure may be utilized and more particularly 0 to 500 psig, the higher pressures generally being generated autogenously at higher temperatures to promote more rapid reaction. The overall time of the reaction including acidification, digestion and neutralization will vary widely and will depend on the particular conditions of the system being utilized. Generally the reaction time will vary from 1 to 30 hours depending on temperature and autogenous pressure conditions.

During acidification, $H_2S$ gas is evolved and sulfur is precipitated and recovered. The acidifying agent may be any suitable acid such as the non-oxidizing mineral acids, e.g., HCl and $H_2SO_4$ and non-oxidizing organic acids and the amount used must be at least sufficient to adjust the pH of the reaction mixture below the isoelectric point and preferably below 1.0.

The digestion step which follows acidification is essential in that the pyridine polysulfides and/or polyhydrosulfides are broken down with the formation of the acid salt of mercaptopyridine and the precipitation of sulfur. This step may be carried out at temperatures of from about ambient to the reflux temperature with the preferred range being 60° to 70° C. and the time will vary widely and digestion will generally be continued until sulfur is no longer precipitated. The importance of this step cannot be overlooked because when comparative experiments were run, a significant decrease in yield was noted when the digestion step was not utilized.

Following acidification and digestion, the pH of the solution is then adjusted to about the isoelectric point with the addition of any suitable base to neutralize the acid salt of the mercaptopyridine thereby liberating free mercaptopyridine. Illustrative of the bases which may be used are the following: sodium hydroxide, potassium hydroxide, ammonium hydroxide, calcium hydroxide, ammonia, sodium carbonate and lime.

The following examples are further illustrative of this invention.

EXAMPLE I

A stirred reactor fitted with reflux condenser, thermometer and addition funnel was charged with a solution of 101.2 g. $Na_2S \cdot 9H_2O$ (0.421 m.) in 225 ml. of water. To this solution was added 41.6 g. (1.30 g. atom) of sulfur and the slurry was heated to reflux at which time a solution of the polysulfides was formed. To this refluxing solution was added dropwise 45.4 g. (0.402 m.) of 2-chloropyridine and the reaction was stirred and heated an additional 24 hours, after which time 3.4 g. of unconverted 2-chloropyridine was recovered via azeotropic distillation, with the water layer being returned to the pot. The reaction mixture was cooled, and the pH adjusted to ~0.5 with 50 ml. of 37 percent HCl. During this process $H_2S$ gas is evolved and sulfur is precipitated. At this point the entire reaction mixture is digested on a steam bath at 60° to 70° C. for one-half hour. The mixture is then filtered hot and the recovered sulfur is washed to neutrality with cold water, the washing added to the clear yellow filtrate. The pH of the solution is then adjusted to the isoelectric point with concentrated caustic solution after which is added 140 g. of NaCl. The mixture is then extracted with two 350 ml. portions of chloroform, the extracts combined, dried over sodium sulfate, filtered, and evaporated to give 35.8g.(0.323 m.) of 2-mercaptopyridine, m.p. 126°–128° C. The infrared spectrum of the product was identical to the I.R. spectrum of an authentic pure sample of 2-mercaptopyridine. This represents an 86.8 percent corrected yield based on a 92.5 percent conversion.

EXAMPLE II

The polysulfide solution was formed in identical fashion as in Example I. While at reflux and with stirring, 63.5 g. (0.402 m.) of 2-bromopyridine was added portionwise over a period of one-half hour. The mixture was refluxed for an additional 4.0 hours, at which time a small amount of volatile organic was azeotroped off. The work-up was identical to Example I. The 2-mercaptopyridine was obtained in a 59.4 percent uncorrected yield, m.p. 127°–130° C. The infrared spectrum of the product was identical to the I.R. spectrum of an authentic pure sample of 2-mercaptopyridine.

EXAMPLE III

The aqueous polysulfide solution was formed as in Examples I and II. This was followed by addition of 2-chloropyridine (22.6 g., 0.2 m.) and after 2.5 hours 100 ml. of ethylene glycol was added. This mixture was refluxed for 18 hours, after which time it was cooled, acidified to a pH of 0.5 with 37 percent HCl, and then digested on a steam bath as in the previous examples. The work-up also followed the same pattern. The 2-mercaptopyridine 17.2 g. (0.154 m.) obtained corresponds to a 77.9 percent yield, uncorrected. The infrared spectrum was identical to the I.R. spectrum of an authentic pure sample of 2-mercaptopyridine.

EXAMPLE IV

To a stirred polysulfide solution consisting of 26.0 g. (0.109 m.) of $Na_2S \cdot 9H_2O$ and 5.25 g. (0.109 g. atom) of sulfur at reflux was added 7.0 g. (0.055 m.) of 2-chloropyridine-N-oxide in 25 ml. of water over a one-hour period. This was refluxed an additional hour, cooled, acidified to pH 0.5 and digested at 70°–80° C. for one-half hour, and filtered hot to remove sulfur. The pH of the filtrate was adjusted to 9 with 23 percent NaOH, treated with 0.5 g. charcoal, filtered, and $ZnSo_4$ solution was added till no more precipitate formed. The precipitate was filtered, washed with water and dried to give 4.16 g. of zinc-2-pyridinethione which represents a 59.4 percent yield based on starting 2-chloropyridine-N-oxide. The infrared spectrum was identical to the I.R. spectrum of an authentic pure sample of zinc-2-pyridinethione, the zinc salt of 2-mercaptopyridine-N-oxide.

EXAMPLE V 101.2 g. $Na_2S \cdot 9H_2O$ are mixed with 225 ml. distilled water until solution is effected. Then 41.6 g. of sulfur was added and the stirred mixture heated to reflux. After 1 hour at reflux 45.4 g. (0.402 m.) of 2-chloropyridine are added over 30 minutes. This is stirred and refluxed for 20 hours. Unreacted 2-chloropyridine is azeotroped off and 12.2 g. collected. This represents a conversion of 73.1 percent. The mixture is cooled to 40° C. and 50 ml. of concentrated HCl are added. This is heated to 70°–77° C. for 1 hour. The mixture is filtered hot to remove sulfur and diluted with 300 cc. of water. It is cooled to 30° C. and the pH adjusted to 4.2 with 10N NaOH. 16.7 g. of 30 percent $H_2O_2$ are added in 15 minutes with stirring. The precipitate is filtered off and washed with 100 cc. $H_2O$, yield 24 g. (75 percent) of 2,2'-dithiopyridine, m.p. 56°–58° C. Yields of up to 89 percent have been achieved in this synthesis.

EXAMPLE VI

To the polysulfide solution as described in Example I at reflux was added a solution of 52.9 g. (0.352 m.) of 4-chloropyridine hydrochloride in 75 ml. of water over a period of approximately 1 hour. The reaction mixture was refluxed an additional 3.0 hours, after which time it was cooled, acidified to a pH of 0.5 with HCl, digested at 70° C. for one-half hour, and filtered warm to remove sulfur. The filtrate was treated with activated charcoal (~4 g.) to remove an oily layer. The clear yellow filtrate, after filtration from the charcoal, was cooled overnight at 2° C., during which time well formed crystals of the 4-mercaptopyridine formed, m.p. 184°–186° C. (literature m.p. 186° C.). A total of 8.6 g. were collected by filtration which represents a 22 percent yield. Additional 4-mercaptopyridine in the aqueous filtrate was converted to the disulfide by addition, with stirring, of 6.0 g. of 30 percent $H_2O_2$ at 25° C. The disulfide was filtered, water washed and dried, m.p. 66°–68° C. (commercial sample m.p. 65°–68.5° C.) giving 10.0 g. white solid yield ~26 percent.

EXAMPLE VII

A solution of 225 ml. of ethylene glycol and 22.7 g. (0.2 m.) of 2-chloropyridine was refluxed with 50.6 g. (0.21 m.) of $Na_2S \cdot 9H_2O$ for 2 hours. It was then diluted to 700 ml. with $H_2O$. After adjusting the pH to 9 with caustic, the mixture was extracted with ethyl acetate and after evaporation only trace amounts of product (2-mercaptopyridine) were found (less than 0.5 g., yield less than 2.2 percent).

Another attempt to obtain the product was made by adjusting the pH of the mixture to 4.5–5.0 and extracting with ethyl acetate. After evaporation, only the presence of 2-chloropyridine in ethylene glycol could be detected with no traceable conversion to the desired product being evident.

What is claimed is:

1. The method for preparing mercaptopyridines comprising:
    a. reacting a halosubstituted pyridine compound having the formula:

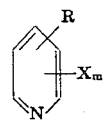

wherein each X is an independently selected halogen group; R is selected from the group consisting of hydrogen, alkyl of 1 to 4 carbon atoms and amino; and m is 1 to 5 with an alkali metal polysulfide compound having the formula:

wherein M is an alkali metal selected from the group consisting of sodium, potassium and lithium and x is from about 2 to about 8
    b. acidifying the reaction mixture to remove $H_2S$ and S;
    c. digesting the reaction mixture to break down the polysulfides and/or polyhydrosulfides with the formation of the acid salt of the mercaptopyridine and
    d. neutralizing said reaction mixture with base to produce the mercaptopyridine product.

2. The method of claim 1 wherein in said polysulfide formula x is from about 3 to about 8.

3. The method of claim 1 wherein in said polysulfide formula x is from about 4 to about 8.

4. The method of claim 1 wherein a solution of said alkali metal polysulfide compound is used.

5. The method of claim 4, wherein the alkali metal polysulfide solution is formed by adding alkali metal sulfide to sulfur in aqueous solution in the ratio of 1:1 to 4:1 parts by weight of alkali metal sulfide to said halosubstituted pyridine compound and 1:1 to 20:1 parts by weight of sulfur to said halosubstituted pyridine compound.

6. The method of claim 1 wherein said halosubstituted pyridine compound is 2-chloropyridine.

7. The method of claim 1 wherein said halosubstituted pyridine compound is 2-bromopyridine.

8. The method of claim 1 wherein the halosubstituted pyridine has halogens in any of the 2, 4 or 6 positions.

9. The method of claim 1 wherein said alkali metal polysulfide is sodium polysulfide.

10. The method of claim 1 wherein the N-oxide of said halosubstituted pyridine compound is used.

11. The method of claim 10 wherein said halosubstituted N-oxide compound is 2-chloropyridine-N-oxide.

12. The method of claim 1 wherein the acid salt of said halosubstituted pyridine compounds is used.

13. The method of claim 12 wherein said halosubstituted acid salt compound is 4-chloropyridine hydrochloride.

* * * * *